United States Patent
Wang et al.

(10) Patent No.: US 10,047,014 B2
(45) Date of Patent: Aug. 14, 2018

(54) PLASMA-SPRAYED TIN COATING HAVING EXCELLENT HARDNESS AND TOUGHNESS, THE PREPARATION METHOD THEREFOR, AND A MOLD COATED WITH SAID TIN COATING

(71) Applicants: Zhiguo Xing, Beijing (CN); Haidou Wang, Beijing (CN); Lihong Dong, Beijing (CN); Guozheng Ma, Guozheng (CN); Binshi Xu, Guozheng (CN)

(72) Inventors: Haidou Wang, Beijing (CN); Zhiguo Xing, Beijing (CN); Huawei Cui, Beijing (CN); Guo Jin, Beijing (CN)

(73) Assignees: Zhiguo Xing, Beijing (CN); Haidou Wang, Beijing (CN); Lihong Dong, Beijing (CN); Guozheng Ma, Beijing (CN); Binshi Xu, Beijing (CN)

( * ) Notice: Subject to any disclaimer, the term of this patent is extended or adjusted under 35 U.S.C. 154(b) by 69 days.

(21) Appl. No.: 15/102,976

(22) PCT Filed: Oct. 13, 2015

(86) PCT No.: PCT/CN2015/091811
§ 371 (c)(1),
(2) Date: Jun. 9, 2016

(87) PCT Pub. No.: WO2016/058513
PCT Pub. Date: Apr. 21, 2016

(65) Prior Publication Data
US 2016/0303774 A1 Oct. 20, 2016

(30) Foreign Application Priority Data

Oct. 13, 2014 (CN) .......................... 2014 1 0539532
Oct. 13, 2014 (CN) .......................... 2014 1 0539533
Oct. 13, 2014 (CN) .......................... 2014 1 0539638

(51) Int. Cl.
C04B 35/58 (2006.01)
C04B 35/622 (2006.01)
(Continued)

(52) U.S. Cl.
CPC ........ *C04B 35/62222* (2013.01); *B29C 33/56* (2013.01); *C04B 35/58014* (2013.01);
(Continued)

(58) Field of Classification Search
USPC ...................................... 264/39, 79, 82, 121
See application file for complete search history.

(56) References Cited

U.S. PATENT DOCUMENTS 4,747,864 A * 5/1988 Hagerty ................ C03B 11/086
65/102
2006/0048603 A1* 3/2006 Sundin .................... C22C 29/04
75/238

FOREIGN PATENT DOCUMENTS

| CN | 104342613 | 2/2015 |
| CN | 104372283 | 2/2015 |
| CN | 104372284 | 2/2015 |

OTHER PUBLICATIONS

Li et al., "Uniform design method for optimization of process parameters of plasma sprayed TiN coatings," *Surface and Coatings Technology*, 176(1):1-13, 2003.
(Continued)

*Primary Examiner* — Sing P Chan
(74) *Attorney, Agent, or Firm* — Parker Highlander PLLC (57) ABSTRACT

Disclosed is an agglomerated TiN powder, the powder comprising spherical aggregates having particle diameters of 40 to 80 μm and formed by the agglomeration of Ti and N having the atomic fractions of 72% and 28% respectively. Also provided is a TiN coating obtained using the powder.

(Continued)

The three-strong-peak phase of the coating is a TiN phase, and also has partial TiO, $TiO_2$, and $Ti_3O$ oxide phases; the coating has layered distribution of bright and dark phases, and the joint between the interior of the layered structure and the layer structure is provided with a small number of pores; the joint between the coating and a base has no microscopic defects such as cracks and is well jointed. The supersonic plasma-sprayed TiN coating achieves hardness as high as $1210HV_{0.1}$, thereby enhancing the wear resistance of the coating. The coating has good fracture toughness, thereby enhancing the fracture mechanical performance inside of the coating and extending the fatigue life of the coating. Also provided are a preparation method for the TiN coating, and a mold coated with said TiN coating.

8 Claims, 5 Drawing Sheets

(51) Int. Cl.
| | |
|---|---|
| *C04B 35/626* | (2006.01) |
| *C04B 35/653* | (2006.01) |
| *C23C 4/02* | (2006.01) |
| *C23C 4/10* | (2016.01) |
| *C23C 4/134* | (2016.01) |
| *B29C 33/56* | (2006.01) |
| *C04B 35/634* | (2006.01) |

(52) U.S. Cl.
CPC ...... *C04B 35/626* (2013.01); *C04B 35/63416* (2013.01); *C04B 35/653* (2013.01); *C23C 4/02* (2013.01); *C23C 4/10* (2013.01); *C23C 4/134* (2016.01); *C04B 2235/3232* (2013.01); *C04B 2235/3886* (2013.01); *C04B 2235/5436* (2013.01); *C04B 2235/79* (2013.01); *C04B 2235/80* (2013.01); *C04B 2235/96* (2013.01)

(56) References Cited

OTHER PUBLICATIONS

Luo et al., "The study of the golden ceramic powder titanium nitride," *Materials Science and Engineering of Powder Metallurgy*, 1(2):55-58, 1996. (English abstract of Chinese text).

Ma et al, "Reactive HVOF sprayed TiN-matrix composite coating and its corrosion and wear resistance properties," *Transactions of Nonferrous Metals Society of China*, 23(4):1011-1018, 2013.

PCT International Search Report issued in International Application No. PCT/CN2015/091811, dated Apr. 15, 2016.

\* cited by examiner

PLASMA-SPRAYED TIN COATING HAVING EXCELLENT HARDNESS AND TOUGHNESS, THE PREPARATION METHOD THEREFOR, AND A MOLD COATED WITH SAID TIN COATING

This application is a national phase application under 35 U.S.C. § 371 of International Application No. PCT/CN2015/091811, filed Oct. 13, 2015, which claims the benefit of Chinese Patent Application Nos. 201410539532.2, filed Oct. 13, 2014, 201410539533.7, filed Oct. 13, 2014 and 201410539638.2, filed Oct. 13, 2014 the entirety of each of which is incorporated herein by reference.

TECHNICAL FIELD

The present invention relates to the field of material technology and research, and particularly to a plasma-sprayed TiN coating layer, a method for preparing the same and a mold coated with the TiN coating layer.

BACKGROUND OF THE INVENTION

A TiN coating layer having a low friction coefficient, a high hardness and a good corrosion resistance is widely applied as a decorative coating layer, a wear-resistant coating layer or a corrosion-resistant coating layer. Currently, TiN coating layers have been prepared by many researchers through technologies such as reaction thermal spraying, chemical vapor deposition (CVD), physical vapor deposition (PVD), an arc plating and the like, and the deposition process, microstructure and properties of the coating layers are studied. The TiN coating layers prepared by CVD, PVD or the like are relatively thin, and thus the mechanical property of the coating layers are reduced; and although thicker TiN coating layers may be prepared by a thermal spraying reaction technology, more pores exist in the coating layers and the coating layers have large brittleness, rendering quality of the coating layers not easy to be controlled. By directly spraying TiN powder with a plasma spraying technique, a relatively thick coating layer can be prepared within a short time; meanwhile, oxidation of TiN occurs during the spraying process to form an oxide phase of Ti, which can improve the toughness of the coating layer.

The plasma spraying technique is widely used for preparing metals, ceramics and composite coating layers to resist abrasion, corrosion and high temperature. During the spraying process, microscopic defects such as oxides and pores tend to be generated because melted particles chemically react with the surrounding medium during the melting and flight process as well as the process of contacting with a matrix surface, resulting in the spraying material to be oxidized; and also because pores are generated inevitably among the molten particles due to successional stacking of the particles as well as rebounding and dissipation of a part of the particles. Microscopic defects such as oxide content and porosity in the coating layers are important standards for evaluating quality of the coating layers. Influence of the porosity and control of the oxide during the plasma spraying process on the properties of the coating layers is studied by scholars, and the microstructure and properties of the coating layers can be improved significantly by controlling appropriate process parameters. Since TiN tends to be decomposed and oxidized under a high temperature and has a large activity, it reacts with other mediums during the plasma spraying process to form an oxide of Ti. The oxide content in the TiN coating layer has a direct influence on the properties of the coating layer since the oxide phases of Ti have a lower hardness and strength than the TiN phase. Fracture toughness is an ability of a material to resist fracture failure. The fracture toughness of the coating layer is measured by an indentation method, which has been widely applied. The hardness and fracture toughness of the coating layer are main indicators for the coating layer to resist crack propagation and fracture, which have a direct impact on the service performance and life of the coating layer.

Currently, the TiN coating layers are prepared by technologies such as the reaction thermal spraying, the chemical vapor deposition (CVD), the physical vapor deposition (PVD), the arc plating and the like, and the deposition process, microstructure and properties of the coating layers have been studied by many researchers. The TiN coating layers prepared by CVD, PVD, etc. are relatively thin, thus the mechanical property of the coating layers is reduced; and although relatively thick TiN coating layers may be prepared by a thermal spraying reaction technology, more pores exist in the coating layers and the coating layers have large brittleness, rendering quality of the coating layers not easy to be controlled. However, by directly spraying TiN powder with plasma, not only the thickness of the coating layer can be ensured, but also the toughness of the coating layer can be improved due to the oxide phase of Ti in the TiN coating layer, thus the coating layer having excellent hardness and toughness can be obtained.

SUMMARY OF THE INVENTION

To solve the above problems, an object of the present invention is to provide a TiN coating layer.

Another object of the present invention is to provide a method for preparing the TiN coating layer.

Still another object of the present invention is to provide a mold coated with the TiN coating layer.

In one aspect, the present invention provides a TiN agglomerated powder, wherein the powder includes 72 at % of Ti and 28 at % of N, and forms spherical aggregates having a particle size of 40 µm to 80 µm after being agglomerated.

Further, the present invention also provides a TiN coating layer prepared from the TiN agglomerated powder.

Moreover, the coating layer includes a phase with three strong peaks attributed to TiN phase, and also includes a portion of TiO, $TiO_2$ and $Ti_3O$ oxide phases, wherein a layered distribution of bright and dark phases is present in the coating layer, and a small amount of pores exist inside of the layered structure and at junction portions of the layered structure, and wherein the coating layer has no microscopic defects such as cracks at portions combined with a matrix, and combines well with the matrix.

In another aspect, the present invention provides a method for preparing the TiN coating layer, comprising the following steps:

(1) preparing a TiN agglomerated powder, wherein the powder comprises 72 at % of Ti and 28 at % of N, and forms spherical aggregates having a particle size of 40 µm to 80 µm after being agglomerated;

(2) pre-treating a mold surface;

(3) spraying by a plasma spraying gun, wherein the spraying is performed with the following spraying parameters: a primary gas for spraying being argon, with a gas flow rate of 38 $L \cdot min^{-1}$ to 42 $L \cdot min^{-1}$; a secondary gas being hydrogen, with a gas flow rate of 12 L·min$^{-1}$ to 16 L·min$^{-1}$; a powder feeding gas being argon, with a spraying distance of 100 mm to 140 mm; a powder feeding amount being 40 g·min$^{-1}$; a spraying power of 41 KW to 50 KW; and a spraying current of 500 A to 600 A; and (4) obtaining the TiN coating layer, wherein the coating layer has a phase with three strong peaks ascribed to a TiN phase, and also comprises a portion of TiO, TiO$_2$ and Ti$_3$O oxide phases.

Preferably, step (1) for preparing the TiN coating layer in the method specifically includes:

(1-1) atomizing TiN powder having a particle size of the power of 1 μm to 5 μm as a raw material;

(1-2) mixing the atomized TiN powder and a binder, adding the mixture into an agglomeration equipment for agglomeration, and drying and then cooling the agglomerated powder;

(1-3) sieving the agglomerated powder through a powder sieve of −200 mesh to 400 mesh, resulting in the TiN agglomerated powder being spherical aggregates having a particle size of 40 μm to 80 μm.

More preferably, a polyvinyl alcohol may be used as the binder, and the binder is generally added in an amount of no more than 1% by weight, which may be used to adjust the free fluidity of the power.

Preferably, pre-treating a mold surface in step (2) includes grinding, cleaning and sandblasting the mold.

More preferably, step (2) specifically includes the following steps:

(2-1) firstly subjecting the mold surface to a grinding treatment such that a roughness of the mold surface achieves Ra=0.8 μm;

(2-2) then subjecting the mold surface to a cleaning treatment with alcohol or acetone to remove greasy dirt on the mold surface; and (2-3) subjecting the mold surface to a sandblasting treatment, wherein a brown corundum having a particle size less than 700 μm is selected to be a material for the sandblasting, a sandblasting air pressure is 0.7 MPa, a sandblasting angle is 45°, and a distance from the spraying gun to the mold surface is 0.15 m.

Preferably, step (3) specifically includes the following steps:

(3-1) spraying a workpiece surface by using a supersonic plasma spraying gun under certain spraying parameters, wherein a scanning process is performed in a form of "Tic-Tac-Toe" with a scanning speed of 1.25m/min; and (3-2) scanning in the form of "Tic-Tac-Toe" on the workpiece surface for 4 to 6 times depending on a deposition speed to result in a coating layer having a thickness of about 200 μm.

More preferably, the spraying parameters in step (3) are as follows: a primary gas for spraying being argon, with a gas flow rate of 38 L·min$^{-1}$; a secondary gas being hydrogen, with a gas flow rate of 16 L·min$^{-1}$; a powder feeding gas being argon, with a spraying distance of 125 mm; a powder feeding amount being 40 g·min$^{-1}$; a spraying power of 46 KW; and a spraying current of 540 A.

Preferably, step (4) for preparing the TiN coating layer in the method specifically is as follows:

(4-1) a melting point of the TiN powder is about 2950° C., sprayed powder, i.e. the TiN agglomerated powder is melted under the high temperature of the plasma beam, and a supersonic plasma spraying equipment may allow the melted powder to possess a high flight speed, and a dense coating layer can be formed; and (4-2) the sprayed powder is deposited onto the matrix, oxidation occurs due to reaction of the melted particles during the flight process with the surrounding air to form TiO, Ti$_3$O and TiO$_2$ oxides, and the toughness of the coating layer can be improved since the oxide phases of Ti have lower strength and hardness than the TiN phase.

In still another aspect, the present invention provides a mold with a surface thereof coated with a TiN coating layer, wherein the coating layer has a phase with three strong peaks ascribed to a TiN phase, and also comprises a portion of TiO, TiO$_2$ and Ti$_3$O oxide phases, wherein a layered distribution of bright and dark phases is present in the coating layer, and a small amount of pores exist inside of the layered structure and at junction portions of the layered structure, and wherein the coating layer has no microscopic defects such as cracks at the portions combined with a matrix, and combines well with the matrix.

Preferably, the TiN coating layer is prepared from TiN agglomerated powder, wherein the powder comprises 72 at % of Ti and 28 at % of N, and forms spherical aggregates having a particle size of 40 μm to 80 μm after being agglomerated.

Preferably, the mold may include metal parts and non-metal parts.

Preferably, the metal parts include a bolt, a gear, a bearing and a drill sleeve.

Further, the present invention provides a bearing sleeve, wherein an inner wall of the bearing sleeve is coated with the TiN coating layer.

The present invention has the following beneficial effects.

TiN powder is sprayed directly according to the present invention, and a wear-resistant ceramic coating layer may be prepared directly on the surface of the parts. Presence of the oxides of Ti in the coating layer improves the toughness of the coating layer. Direct spraying of the TiN coating layer can avoid the shortcomings of large brittleness and complex process as well as the need for great human and material resources traditionally when reactive spraying of TiN layer is adopted.

According to the present invention, the TiN coating layer is prepared by the supersonic spraying, wherein the coating layer is relatively dense and has a small amount of pores, and the coating layer binds well with the matrix and has a thickness of about 200 μm. The coating layer has a fracture toughness of $3.94^{MPa\cdot\sqrt{m}}$ measured by an indentation method.

In the present invention, the TiN coating layer is prepared by plasma spraying the TiN powder. This method is capable of directly spraying the powder, is simple to operate, is easy for promotion and greatly saves the cost.

The TiN coating layer according to the present invention prepared by the supersonic plasma spraying has a high hardness which can reach 1210HV$_{0.1}$. The wear resistance of the coating layer can be improved due to the high hardness. Also, the coating layer has a large fracture toughness, which can improve the fracture mechanical properties of the coating layer, and prolong the fatigue life of the coating layer.

DETAILED DESCRIPTION OF THE INVENTION

The present invention will be described below in detail with reference to accompanying drawings and the detailed description thereof. However, the protect scope of the present invention is not limited to the following examples, and it shall encompass the whole contents of the claims.

Conventional instruments are used in the examples, and the model of the Fermenter is BIOSTAR Bplus, Germany.

EXAMPLE 1

Preparation of the Coating Layer

The preparation process of the coating layer included four stages: preparation of TiN agglomerated powder; pre-treatement of a mold surface; optimization of spraying parameters; and spraying. The four stages were as follows.

(1) Preparation of TiN agglomerated powder:

(1-1) TiN powder having a particle size of the power of 1 μm to 5 μm as a raw material was atomized;

(1-2) the atomized TiN powder and a binder were mixed and added into an agglomeration equipment for agglomeration, and the agglomerated powder was dried and cooled;

(1-3) the agglomerated powder was sieved through a powder sieve of -200 mesh to 400 mesh, resulting in the TiN agglomerated powder being spherical aggregates having a particle size of 40 μm to 80 μm.

The powder included 72 at % of Ti and 28 at % of N, and the powder was agglomerated to form spherical aggregates having a particle size of 40 μm to 80 μm.

(2) Pre-treatement of a mold surface:

(2-1) a grinding treatment was performed on the mold surface such that a roughness of the mold surface achieved Ra=0.8 μm;

(2-2) a cleaning treatment was conducted on the mold surface with alcohol or acetone to remove greasy dirt on the mold surface; and (2-3) the mold surface was subjected to a sandblasting treatment, wherein a brown corundum having a particle size less than 700 μm was selected to be a material for the sandblasting, a sandblasting air pressure was 0.7 MPa, a sandblasting angle was 45°, and a distance from the spraying gun to the mold surface was 0.15 m.

(3) Spraying:

(3-1) A supersonic plasma spraying gun was used as the spraying equipment. The spraying parameters were as follows.

The primary gas for spraying was argon with a gas flow rate of $38 L \cdot min^{-1}$; the secondary gas for spraying was hydrogen with a gas flow rate of $16 L \cdot min^{-1}$; the powder feeding gas was argon, and the spraying distance was 125mm; the powder feeding amount was $40 g \cdot min^{-1}$, the spraying power was 46 KW, and the spraying current was 540A.

(3-2) With the spraying parameters, a workpiece surface was sprayed by using a supersonic plasma spraying gun, wherein a scanning process was performed in a form of "Tic-Tac-Toe" with a scanning speed of 1.25 m/min; and (3-2) scanning in the form of "Tic-Tac-Toe" was conducted on the workpiece surface for 4 to 6 times depending on a deposition speed to result in a coating layer having a thickness of about 200 μm.

(4) Obtaining the TiN coating layer.

(4-1) a melting point of the TiN powder was about 2950° C., sprayed powder, i.e. the TiN agglomerated powder was melted under the high temperature of the plasma beam, and a supersonic plasma spraying equipment could allow the melted powder to possess a high flight speed, and a dense coating layer could be formed; and (4-2) the sprayed powder was deposited onto the matrix, oxidation occurs due to reaction of the melted particles during the flight process with the surrounding air to form TiO, $Ti_3O$ and $TiO_2$ oxides, and the toughness of the coating layer could be improved since the oxide phases of Ti had a lower strength and hardness than those of the TiN phase.

Figure 1:
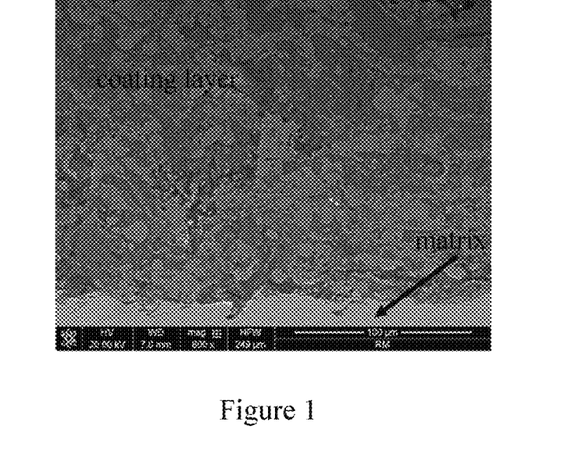
FIG. 1 shows a TiN coating layer prepared according to Example 1 of the present invention.

The resulting TiN coating layer, as shown in FIG. 1, is dense with a small amount of pores therein, which binds well with the matrix and has a thickness of about 200 μm. The fracture toughness of the coating layer measured by the indentation method is $4.26^{MPa \cdot \sqrt{m}}$.

EXAMPLE 2

Influence of the Spraying Parameters

Spraying power and spraying distance, among the spraying parameters, are main indicators which have influence on the coating layer. Ten different process parameters are employed to optimize the coating layer. The specific process parameters are shown in Table 1 and Table 2, the criteria for optimization indicators is for hardness and fracture toughness.

TABLE 1

Spraying parameters with different spraying powers

| process | power/KW | current/A | argon/(L · min$^{-1}$) | hydrogen/ (L · min$^{-1}$) | spraying distance/mm | powder feeding amount/ (g · min$^{-1}$) |
|---------|----------|-----------|------------------------|----------------------------|----------------------|-----------------------------------------|
| ST1 | 41 | 540 | 42 | 12 | 125 | 40 |
| ST2 | 43 | 540 | 42 | 13 | 125 | 40 |
| ST3 | 45 | 540 | 40 | 14 | 125 | 40 |
| ST4 | 46 | 540 | 38 | 16 | 125 | 40 |
| ST5 | 50 | 540 | 38 | 16 | 125 | 40 |

TABLE 2

Spraying parameters with different spraying distances

| process | power/KW | current/A | argon/(L · min$^{-1}$) | hydrogen/ (L · min$^{-1}$) | spraying distance/mm | powder feeding amount/ (g · min$^{-1}$) |
|---|---|---|---|---|---|---|
| ST6 | 46 | 540 | 38 | 16 | 100 | 40 |
| ST7 | 46 | 540 | 38 | 16 | 110 | 40 |
| ST8 | 46 | 540 | 38 | 16 | 125 | 40 |
| ST9 | 46 | 540 | 38 | 16 | 130 | 40 |
| ST10 | 46 | 540 | 38 | 16 | 140 | 40 |

By changing five groups of process parameters of ST1 to ST5, the hardness results under different spraying powers are as follows. Under the process parameter of ST4, when the spraying power is 46 KW, the coating layer has a highest hardness of 1402HV$_{0.1}$. Under the process parameters of ST5, ST3, ST1 and ST2, the hardness of the coating layers decreases in this order, which are 1248 HV$_{0.1}$, 1096 HV$_{0.1}$, 1012 HV$_{0.1}$ and 985 HV$_{0.1}$, respectively.

By changing five groups of process parameters of ST6 to ST10, different oxide contents in the coating layers are mainly caused by different spraying distances under the optimum spraying power, thereby resulting in difference in the fracture toughness of the coating layers. When the oxide content in the coating layer is approximately 16% under the process parameter of ST8, the coating layer has a largest fracture toughness of $4.26^{MPa \cdot \sqrt{m}}$. Under the process parameters of ST10, ST7, ST9 and ST6, the fracture toughness of the coating layers decreases in this order, which are $4.02^{MPa \cdot \sqrt{m}}$, $3.94^{MPa \cdot \sqrt{m}}$, $3.92^{MPa \cdot \sqrt{m}}$ and $3.85^{MPa \cdot \sqrt{m}}$, respectively.

Change in the spraying power has a direct influence on the porosity of the coating layer by changing the spraying parameters of the coating layer, and the results are shown in Table 3.

TABLE 3

Porosity of the coating layer under different spraying powers

| Spray trial | ST1 | ST2 | ST3 | ST4 | ST5 |
|---|---|---|---|---|---|
| Porosity(%) | 6.43 | 5.36 | 4.21 | 3.63 | 4.64 |

Figure 2:
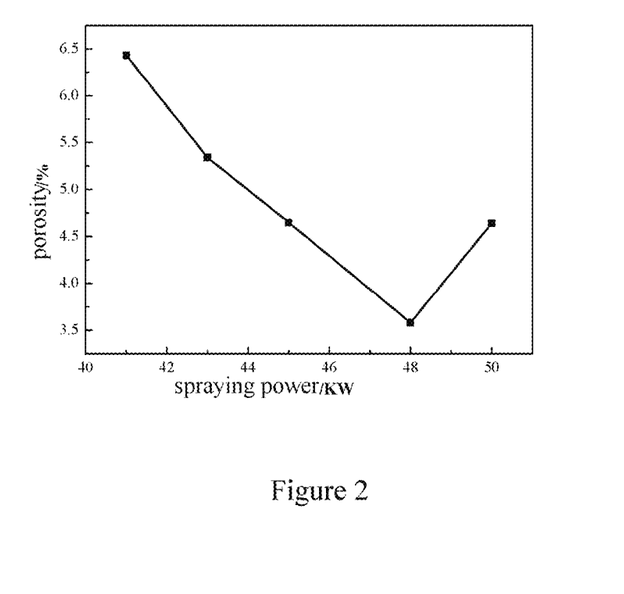
FIG. 2 is a trend diagram showing influence of the spraying power on porosity.

With decrease in the spraying power, porosity in the coating layers exhibits a trend of increasing at first and then decreasing, and in the case that the spraying power is 46 KW, the coating layer has a smallest porosity, which are particularly shown in FIG. 2.

EXAMPLE 3

Influence of the Spraying Distance on the Oxide Content

The influence of the spraying distance on the oxide content is detected using three parameters, which is particularly shown in Table 4.

TABLE 4

Influence of the spraying distance on the oxide content the EDS results of the coating layers under three parameters

| Spray trial | Ti | O | N |
|---|---|---|---|
| ST6 | 61.48 | 20.60 | 17.92 |
| ST7 | 53.84 | 17.65 | 28.51 |
| ST8 | 57.76 | 16.23 | 26.01 |
| ST9 | 59.84 | 13.65 | 26.51 |
| ST10 | 61.76 | 15.32 | 22.92 |

Figure 3:
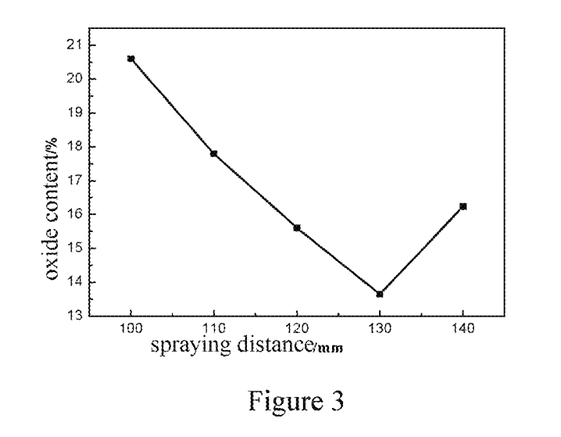
FIG. 3 is a diagram showing influence of spraying distance on content of oxides.

With increase in the spraying distance, the oxide content in the coating layers exhibits a trend of decreasing at first and then increasing, and in the case that the spraying distance is approximately 125 mm, the coating layer has a smallest oxide content, which are particularly shown in FIG. 3.

EXAMPLE 4

Properties of the Coating Layer According to Example 1

Figure 4:
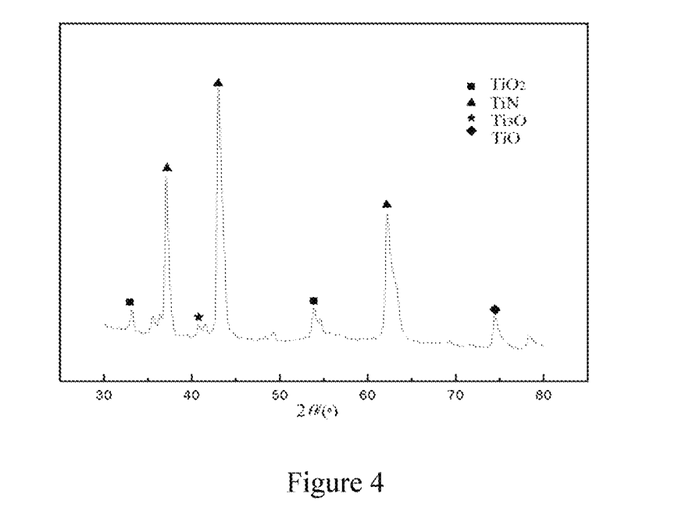
FIG. 4 is a diagram showing XRD measurement results of the coating layer.

In order to measure the phase composition and phase structure of the coating layer, phase composition of the coating layer prepared according to Example 1 was analyzed by the X-ray diffraction analyzer (XRD) of Model D8 from the BRUKER company using Cu target as the diffraction target and diffraction wavelength of 0.154056 nm, and the test results were shown in FIG. 4.

FIG. 4 shows the XRD pattern of the TiN coating layer. The phase with three strong peaks of the coating layer shown in this figure is ascribed to a TiN phase through comparing with the PDF card, and the TiN phase exhibits a strong (200) orientation. In addition, portions of TiO, TiO$_2$ and Ti$_3$O oxide phases are also present, because TiN is oxidized under the high temperature during the plasma spraying process to form oxides of Ti. Presence of TiO and Ti$_3$O metastable phases in the coating layer is due to insufficient oxidization and deposition of TiN during the plasma spraying process. The intensity of the three strong peaks of the TiN phase is much higher than that of the oxide phases, indicating the main phase in the coating layer is TiN phase.

Figure 5:
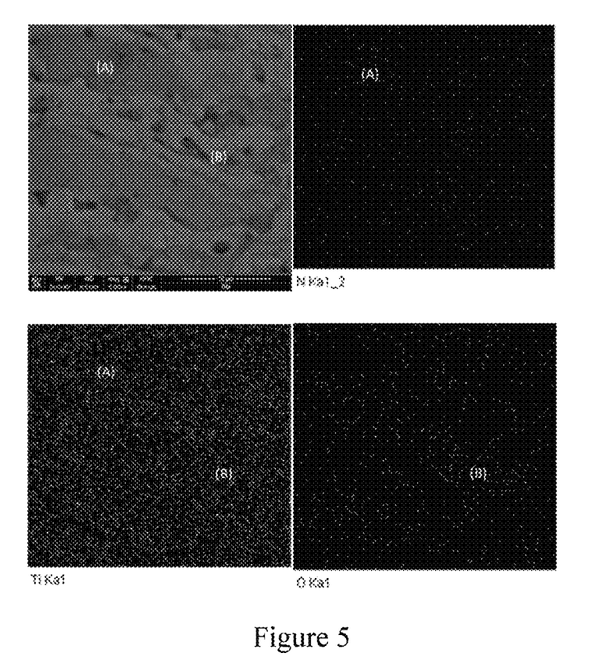
FIG. 5 is a diagram showing morphology of the coating layer using SEM.

In order to determine the distribution of respective elements in the coating layer, an elemental analysis is performed on the TiN coating layer by the Energy Dispersive Spectrometer (EDS) employed in the Nova Nano SEM450 typed scanning electron microscope, the results of which are shown in FIG. 5 and Table 5, for purpose of determining the junction between respective phases in the coating layer.

TABLE 5

EDS results of the coating layer

| Ti | O | N |
|---|---|---|
| 57.76 | 16.23 | 26.01 |

As can be seen from FIG. 5 which shows a cross-sectional scanning photo, a layered distribution of bright and dark phases is present in the coating layer, and a small amount of pores exist inside of the layered structure and at junction portions of the layered structure. From the cross-sectional scanning element distribution image, it can be seen that Ti element is uniformly distributed throughout the cross section, but N element and O element have regional distribution. A region, which is dark in color in the SEM photo, is rich in ingredients of Ti and N, but is poor in O. In contrast, B region, which is bright in color, is rich in ingredients of Ti and O, but is poor in N. In combination with the XRD results, it can be analyzed that the main ingredient in A region is TiN phase, and the main ingredients in B region are the oxide phases of Ti and a small amount of TiN phase. A region and B region exhibit different colors, which is mainly likely caused by different oxide contents.

Figure 6:
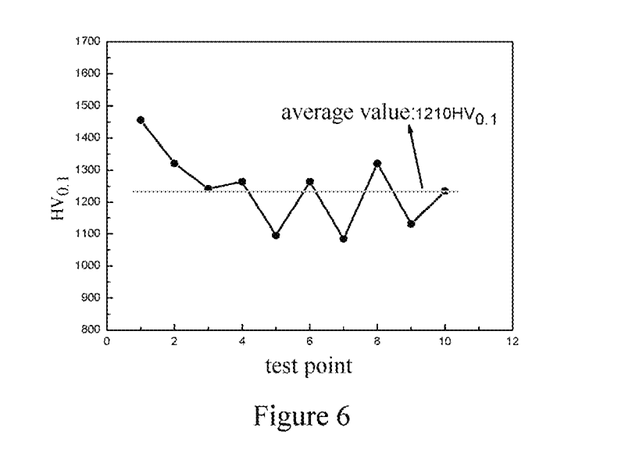
FIG. 6 is a diagram showing the hardness measurement results of the coating layer.

The microhardness of the coating layer was measured by using a HVS-1000 typed Digital Display Vickers hardness tester, with an applied load being 100 g, an loading time being 15S, and the number of test points being 10. The average hardness of the coating layer reaches $1210HV_{0.1}$. It can be seen that the coating layer exhibits a relatively high hardness, as particularly shown in FIG. 6.

Figure 7:
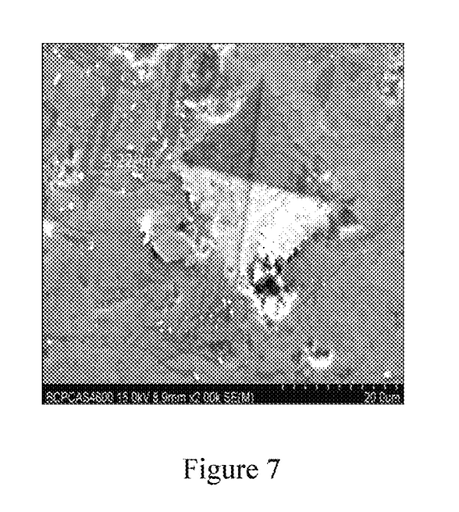
FIG. 7 shows an indentation morphology after a fracture toughness test.

An indentation was pressed out by the HVS-1000 typed Digital Display Vickers hardness tester, as shown in FIG. 7 and Table 6, and the fracture toughness of the coating layer was calculated by the indentation method using the following formula:

$$Hv = \frac{0.4636 P}{a^2} \quad (1)$$

$$K_{IC} = \frac{0.016 (E/H)^{\frac{1}{2}} P}{c^{\frac{3}{2}}} \quad (2)$$

In formula (1), a is half of the diagonal indentation length; P is the applied load. And in formula (2), E is Young's modulus; and c is a radial crack length from the indentation center to the edge of the crack.

TABLE 6

Calculated parameters for fracture toughness $K_{IC}$ of the coating layer

| A/μm | c/μm | $K_{IC}$ (MPa · √m̄) |
|---|---|---|

The spraying parameters not only have influence on porosity and oxides, but also have influence on hardness and fracture toughness of the coating layer.

Figure 8:
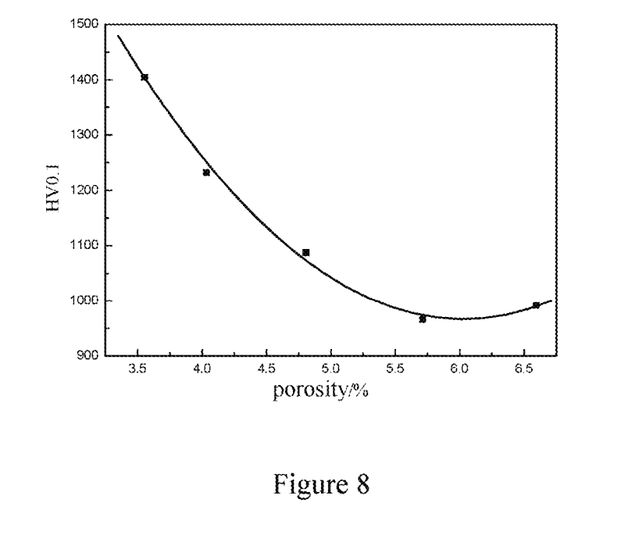
FIG. 8 is a diagram showing influence of various porosities on the hardness of the coating layer.

Trend of influence of the porosity in the coating layer on the hardness thereof was shown in FIG. 8. It can be seen that for three processes, the hardness of the coating layer presents a significantly reduced tendency with increase in the porosity of the coating layer. The coating layer has a highest hardness of $1402HV_{0.1}$ in the case that the porosity is relatively small.

Figure 9:
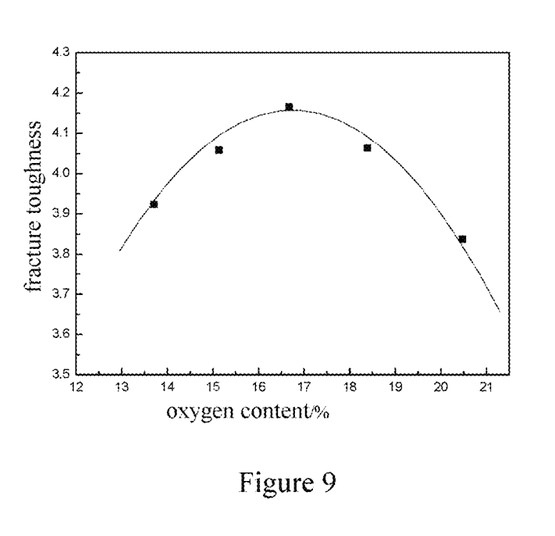
FIG. 9 is a diagram showing influence of various oxide contents on fracture toughness of the coating layer.

Trend of influence of the oxide in the coating layer on the fracture toughness thereof was shown in FIG. 9. It can be seen that the fracture toughness of the coating layer presents a trend of increasing at first and then decreasing with increase in the oxide content, and the coating layer has a largest fracture toughness of $4.26^{MPa \cdot \sqrt{m}}$ when the oxide content in the coating layer is approximately 16%.

APPLICATION EXAMPLE

Spraying on a Mold

As to the specific spraying method, please refer to the process described in Example 1.

1. Bolt: a TiN coating layer sprayed to a bolt surface by plasma spraying could improve the wear resistance of the bolt surface. In a friction and wear test, over 30 minutes, the wear volume in case of no sprayed coating layer is 82547 μm³, while the wear volume after spraying the coating layer is 20636 μm³. The wear resistance for the bolt sprayed with the coating layer has increased 4.03 times than that of the bolt which is not sprayed. Attention should be paid to the issue regarding size tolerance of the bolt surface during the spraying process.

2. Gear: a TiN coating layer sprayed to a gear surface by plasma spraying could greatly improve contact fatigue life of the gear surface during the recontacting process. A contact fatigue accelerated life test is performed under a large load on the gear surface sprayed with the coating layer and the gear surface with no sprayed coating layer. It is found that the gear sprayed with the coating layer manifests surface wear after rotating 130000 times, while the gear with no sprayed coating layer manifests surface wear after rotating 42000 times. That is, the contact fatigue accelerated life of the gear sprayed increases 3.1 times than that of the gear which is not sprayed.

3. Bearing: a TiN coating layer sprayed to the outer side of the bearing by plasma spraying could improve the wear resistance of the bearing surface. In a friction and wear test, over 30 minutes, the wear volume in case of no sprayed coating layer is 91844 μm³, while the wear volume after spraying the coating layer is 25659 μm³. The wear resistance for the bearing sprayed with the coating layer has increased 3.58 times than that of the bearing which is not sprayed.

4. Drill sleeve: a TiN coating layer sprayed to a drill sleeve surface by plasma spraying could improve the failure of the parts due to impact and abrasion of the sediment or the like during the operation. An impact erosion test is performed on the drill sleeve surface sprayed with the TiN coating layer and the drill sleeve surface without the TiN coating layer. In the case that the impact erosion angle is 60° and the impact erosion time is 20 minutes, the impact erosion pit volume for the drill sleeve surface sprayed with the TiN coating layer is 186379 μm³, while the impact erosion pit volume for the drill sleeve surface without the TiN coating layer is 650616 μm³. That is, the life of the part sprayed with the TiN coating layer is 3.49 times longer than that of the part without the TiN coating layer, and thus the life of the part is greatly improved.

These described above are only the preferred embodiments of the invention. It should be noted that various modifications and variations can be made by those ordinary skilled in the art without deviating from the principle of the invention, which should also be regarded as being within the scope of the present invention.

The invention claimed is:

1. A method for preparing the TiN coating layer, comprising:
   (1) preparing a TiN agglomerated powder, wherein the powder comprises 72% of Ti and 28% of N, and forms spherical aggregates having a particle size of 40 μm to 80 μm after being agglomerated, as follows:
      (1-1) atomizing raw material of the TiN powder;
      (1-2) mixing the atomized TiN powder and a binder, adding the mixture into an agglomeration equipment for agglomeration, and drying and then cooling the agglomerated powder;
      (1-3) sieving the agglomerated powder through a powder sieve of −200 mesh to 400 mesh, resulting in the TiN agglomerated powder being spherical aggregates having a particle size of 40 μm to 80 μm;
   (2) pre-treating a mold surface;
   (3) spraying by a plasma spraying gun, wherein the spraying is performed with the following spraying parameters: a primary gas for spraying being argon, with a gas flow rate of 38 L·min$^{-1}$ to 42 L·min$^{-1}$; a secondary gas being hydrogen, with a gas flow rate of 12 L·min$^{-1}$ to 16 L·min$^{-1}$; a powder feeding gas being argon, with a spraying distance of 100 mm to 140 mm; a powder feeding amount being 40 g·min$^{-1}$; a spraying power of 41 KW to 50 KW; and a spraying current of 500 A to 600 A; and
   (4) obtaining the TiN coating layer, wherein the coating layer has a phase with three strong peaks ascribed to a TiN phase, and also comprises a portion of TiO, TiO$_2$ and TiO$_3$ oxide phases.

2. The method according to claim 1, wherein the coating layer includes a phase with three strong peaks attributed to TiN phase, and also includes a portion of TiO, TiO$_2$ and Ti$_3$O oxide phases, wherein a layered distribution of bright and dark phases is present in the coating layer, and a small amount of pores exist inside of the layered structure and at junction portions of the layered structure, and wherein the coating layer has no microscopic defects such as cracks at the portions combined with a matrix, and combines well with the matrix.

3. The method according to claim 1, wherein the binder is a polyvinyl alcohol added in an amount of no more than 1% by mass of the TiN powder.

4. The method according to claim 1, wherein pre-treating a mold surface in step (2) comprises grinding, cleaning and sandblasting of the mold.

5. The method according to claim 1, wherein step (2) comprises:
   (2-1) firstly subjecting the mold surface to a grinding treatment such that a roughness of the mold surface achieves Ra=0.8 μm;
   (2-2) then subjecting the mold surface to a cleaning treatment with alcohol or acetone to remove greasy dirt on the mold surface; and
   (2-3) subjecting the mold surface to a sandblasting treatment, wherein a brown corundum having a particle size less than 700 μm is selected to be a material for the sandblasting, a sandblasting air pressure is 0.7 MPa, a sandblasting angle is 45°, and a distance from the spraying gun to the mold surface is 0.15 m.

6. The method according to claim 1, wherein step (3) comprises:
   (3-1) spraying a workpiece surface by using a supersonic plasma spraying gun under certain spraying parameters, wherein a scanning process is performed in a form of "Tic-Tac-Toe" with a scanning speed of 1.25 m/min; and
   (3-2) scanning in the form of "Tic-Tac-Toe" on the workpiece surface for 4 to 6 times depending on a deposition speed to result in a coating layer having a thickness of about 200 μm.

7. The method according to claim 1, wherein the spraying parameters in step (3) are as follows: a primary gas for spraying being argon, with a gas flow rate of 38 L·min$^{-1}$; a secondary gas being hydrogen, with a gas flow rate of 16 L·min$^{-1}$; a powder feeding gas being argon, with a spraying distance of 125 mm; a powder feeding amount being 40 g·min$^{-1}$; a spraying power of 46 KW; and a spraying current of 540 A.

8. The method according to claim 1, wherein in step (4),
   (4-1) the TiN agglomerated powder, is melted under the high temperature of the plasma beam due to a melting point of the TiN powder being about 2950° C., and a dense coating layer can be formed since a supersonic plasma spraying equipment may allow the melted powder to possess a high flight speed; and
   (4-2) when the sprayed powder is deposited onto the matrix, oxidation occurs due to reaction of the melted particles during the flight process with the surrounding air to form TiO, TiO$_3$ and TiO$_2$ oxides, and the toughness of the coating layer can be improved because the oxide phases of Ti have lower strength and hardness than those of the TiN phase.

\* \* \* \* \*

UNITED STATES PATENT AND TRADEMARK OFFICE
CERTIFICATE OF CORRECTION

PATENT NO. : 10,047,014 B2
APPLICATION NO. : 15/102976
DATED : August 14, 2018
INVENTOR(S) : Zhiguo Xing et al.

Page 1 of 1

It is certified that error appears in the above-identified patent and that said Letters Patent is hereby corrected as shown below:

On the Title Page

Item (71) Applicants, delete both occurrences of "Guozheng (CN)" and insert --Beijing (CN)-- therefor.

Signed and Sealed this
Sixteenth Day of October, 2018

Andrei Iancu
*Director of the United States Patent and Trademark Office*